United States Patent [19]
Bartolomeo

[11] Patent Number: 4,624,568
[45] Date of Patent: Nov. 25, 1986

[54] HOLOGRAPHIC TEST METHOD FOR ROTATIONAL EFFECTS ON GEARS

[75] Inventor: Mark E. Bartolomeo, Vernon, Conn.
[73] Assignee: Eaton Corporation, Cleveland, Ohio
[21] Appl. No.: 722,232
[22] Filed: Apr. 11, 1985
[51] Int. Cl.$^4$ ............................ G03H 1/30; G01B 9/21
[52] U.S. Cl. ...................................... 356/347; 350/3.77
[58] Field of Search ........................ 356/345, 347, 348; 350/3.6, 3.75, 3.77

[56] References Cited
U.S. PATENT DOCUMENTS
3,612,693 10/1971 Stetson .................................. 356/348
3,709,605 1/1973 Tsuruta .................................. 356/347

*Primary Examiner*—Eugene R. LaRoche
*Assistant Examiner*—D. C. Mis
*Attorney, Agent, or Firm*—C. H. Grace; A. E. Chrow

[57] ABSTRACT

A holographic method for determining rotational effects upon either gear of gears (1, 2) of a gear set having respective mutually orthogonal rotational axis ($C_1$, $C_2$). Particularly, a holographic recording medium or element 12 is secured to gear (1) so that is rotates in synchronization therewith about axis ($C_1$). Gear (2) is illuminated by a pulsed collimated light beam (L) emitted from a source (14) such as a laser. Beam (L) is reflected from gear (2) as object beam (0) substantially parallel to axis $C_2$ and means such as a semi-reflective mirror 16 having a slit (18) is provided for directing a reference beam (R) and object beam (0) towards element (12). Development of element (12) after exposing it to beams (R and 0) at two different rotational conditions provides interference lines ($f_1$, $f_2$) enabling a viewer of the holographic image of gear 2 to determine the effect of rotation thereupon.

3 Claims, 2 Drawing Figures

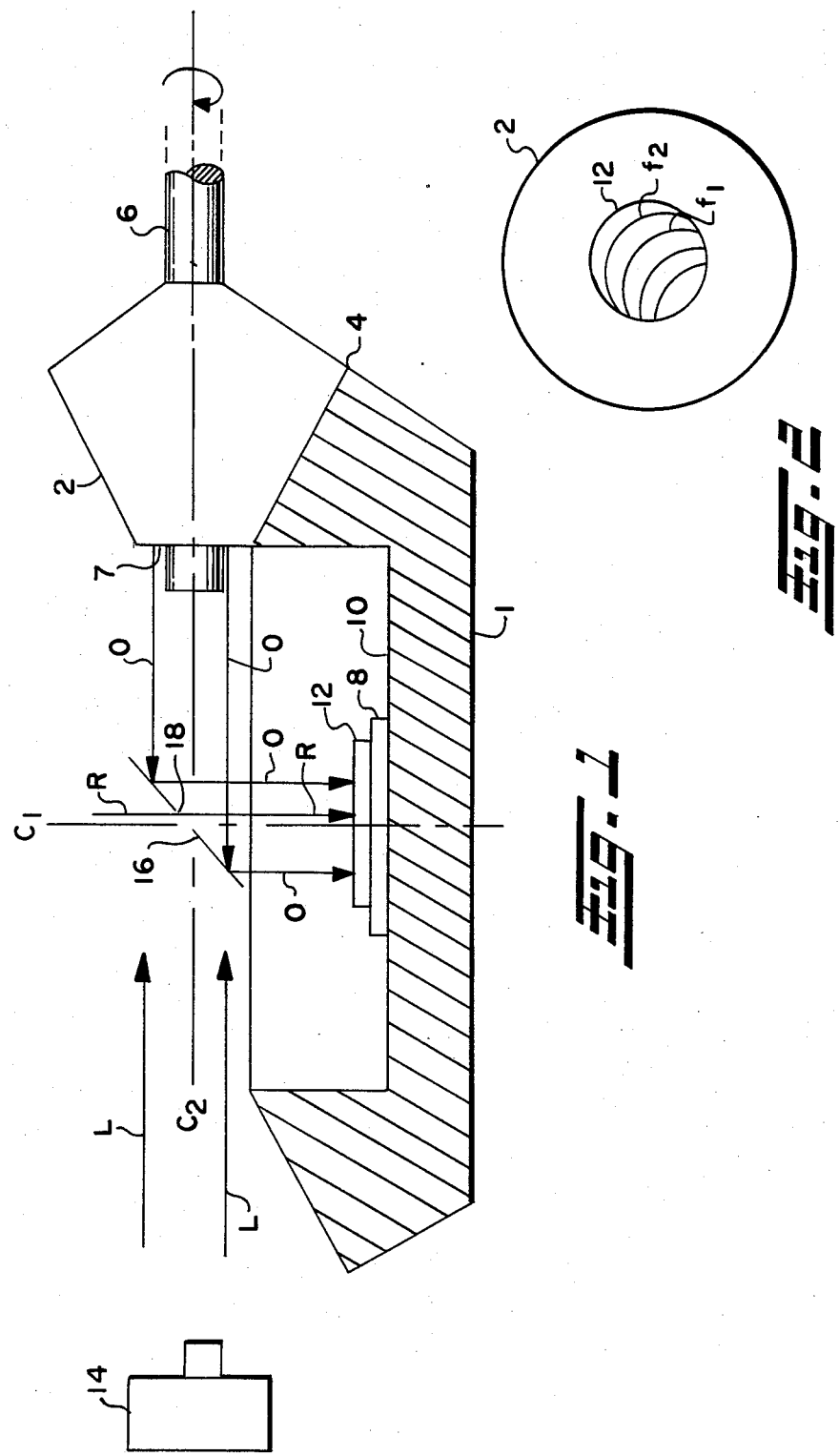

4,624,568

HOLOGRAPHIC TEST METHOD FOR ROTATIONAL EFFECTS ON GEARS

INTRODUCTION

This invention relates generally to a method of determining physical changes occuring in gear sets under dynamic rotating conditions and more particularly to a holographic method for determining same.

BACKGROUND OF THE INVENTION

Holography is an optical phenomenon for which a rising interest in practical applications has occurred since about 1960. Briefly, holography is an optical process by which an object is illuminated by a pulsed collimated beam of light such as from a pulse type laser and the reflected light therefrom (called an object beam) is impinged along with a reference beam of light onto a holographic element or recording medium which is then developed and viewed through to provide a holographic image of the object. The holograhic element may be a high-resolution photographic film, a photoresist, or gelatin impregnated with light sensitive ammonium dichromate as is well known to those skilled in the art of holography. The interference and object beams interfere to create an extremely fine pattern of light and dark fringes on the surface of the holographic element which when developed enable the developed to provide an image identical to the original object when illuminated with a replica of the reference beam. Generally, holograms are similar to refraction gratings which deflect light of different wave lengths at different angles with the added advantage of being able to reproduce an image of the original object as previously described.

The holographic process provides a means of "fingerprinting" an image of the original object by means of refractance interference lines which characterize the object and which change when a physical abberation is present or occurs in the object between successive exposures to the holographic element. Thus, optical intereference refractance lines appearing in the holographic image can be used to determine the nature and extent of physical changes and/or stresses occuring in an object subjected to the holographic process over spaced periods of time.

Examples of practical applications of the holographic process are respectively disclosed in U.S. Pat. No. 3,509,761; for determining deformation stress in an object, and in U.S. Pat. No. 3,612,693; for determining corrosive effects on the surface of an object, and in U.S. Pat. No. 3,709,605; for determining dynamic variations occurring in a singular rotating object, the disclosures of all of which are incorporated herein by reference.

An area of concern for many years has been to provide a simple and inexpensive method of determining changes occurring in gear sets, particularly gear sets such as a differential ring or pinion gears that engage each other at 90 degrees, under dynamic rotating conditions. Under rotating conditions shape changes and vibrating displacement conditions may occur which are virtually undetectable by ordinary measurement techniques including conventional high speed photography and stroboscopic principles. It has been discovered that the holographic process is able to satisfy this concern by providing a simple, inexpensive, and highly accurate method of determining dynamic rotational characteristics of gear sets having mutual orthogonal rotational axis.

SUMMARY OF THE INVENTION

Accordingly, it is an object of this invention to provide a method for determining dynamic rotational characteristics of a gear set.

It is another object of this invention to determine dynamic rotational characteristics of a gear set having mutually orthogonal central rotational axis.

It is still a further object of this invention to provide a simple and inexpensive method of determining dynamic rotational characteristics of a gear set having mutually orthogonal central rotational axis that utilizes a holographic process.

BRIEF DESCRIPTION OF THE DRAWINGS

FIG. 1 shows a partial schematic plan view of the method of the invention applied to a differential gear set; and FIG. 2 shows refractance interference lines resulting from rotation of the gear set of FIG. 1.

DESCRIPTION OF SOME PREFERRED EMBODIMENTS

FIG. 1 shows an example of the holographic method of the invention applied to a typical ring gear 1 and pinion gear 2 of a differential. Gears 1 and 2 have their respective teeth, not referenced, in meshed engagement at reference 4.

Normally, pinion gear 2 is driven rotationally such as by a drive shaft 6 and, in turn, rotates ring gear 1 which in turn is operatively connected to and drives for example a vehicular axle.

Gears 1 and 2 have respective mutually orthogonal central rotational axis $C_1$ and $C_2$ about which they respectively rotate as shown by the arrows in FIG. 1.

As previously described, one of the problems has been to determine with a reasonable degree of accuracy and reliability what changes occur to either or both of gears 1 and 2 under rototating conditions such as changes in shape, vibration displacement, stress, etc.

Such is provided by employing holographic techniques previously described where, for the example of FIG. 1, the kinematic effect of rotation on gear 2 is being examined to determine for example displacement, deformation and stress that may be characteristic of the particular gear set selected. In FIG. 1, a holographic element 12 is secured by means of a support plate 8 to face 10 of gear 1 so that is is centered about and rotates in synchronization with gear 1 about rotational axis $C_1$.

Face 7 of gear 2 is illuminated by light beam L which is a pulsed collimated light beam emitted from source 14 such as a pulsed laser well known to those skilled in the art. Light beam L impinges on face 7 of gear 2 and is reflected as object beam "O" away from face 7 in a direction substantially parallel to rotational axis $C_2$.

Means such as semi-reflecting mirror 16 is positioned angularly with respect to orthogonal axis $C_1$ and $C_2$ to direct reflected beam "O" towards optical element 12. Optical element 12, as previously described, is preferably a photoresist film suitable for use in providing holographic images.

A reference beam "R" of light is likewise directed towards holographic element 12 by passing through slit 18 in mirror 16. Reference beam "R" may be provided from light beam "L" by employing a divider lens or by use of mirror where desired or may eminate from an entirely different source when desired. The difference between beam "R" and beam "O" being that the latter is reflected light from the object where beam "R" is not. Note that beam "O" is reflected from mirror 16 in a direction substantially parallel to rotational axis $C_1$. Preferably, reference beam "R" is likewise substantially parallel to axis $C_1$.

Exposure of beams "R" and "O" to holographic element 12 provides a holographic image of face 7 of gear 2 upon developing holographic element 12 and viewing through element 12 in conjunction with a reference beam of light as is well known to those skilled in the art.

The method of the invention provides for a double exposure of holographic element 12 at two different rotating conditions such as for example when gears 1 and 2 are stationary and when they are rotating at conventional operating rpm. Physical changes occurring to gear 2 under the dynamics of rotation will result in differences in object beam "O" which will result in refraction interference lines appearing on the holographic image recorded by doubly exposed holographic element 12.

FIG. 2 shows a holographic image of gear 2 derived from a holographic element exposed to beams "R" and "O" at two different rotational speeds. The results for illustrative purposes is a pattern of refractance interference lines $f_1$; $f_2$, etc. that provide a fingerprint of the effect of rotation on gear 2. It can readily be seen that once a pattern has been obtained for a set of such gears known to mesh satisfactorily under operating conditions, such can then be compared to the particular gear set being examined as a means of determining quality.

Although shown in FIG. 1 for determining rotational effects upon gear 2, understandably the referenced elements can be rearranged to provide similar information for gear 1 as well as employing various lenses and/or mirrors well known to those skilled in holographic techniques.

What is claimed is:

1. A holographic method for determining dynamic rotational stress characteristics between a first and second gear pair having mutually orthogonal central rotational axis, said method including the steps of:
   (a) mounting a holograhic recording medium for synchronized rotation with said first gear about the central rotational axis thereof;
   (b) providing a pulsed collimated light beam source,
   (c) illuminating the second gear with the light beam of step (b) to provide an object beam of reflective light therefrom in a direction substantially parallel to the rotational axis thereof,
   (d) providing a reference light beam,
   (e) providing means for directing the reference and object light beams towards the holographic medium of step (a) with at least said object light beam in a direction substantially parallel to the rotational axis of said first gear,
   (f) exposing the holographic medium of step (a) to the reference and object light beam of step (e) at a first rotational condition of said first and second gears,
   (g) exposing the holographic medium of step (f) to the reference and object light beams of step (e) at a second rotational condition of said first and second gears,
   (h) developing the holographic medium of step (g), and
   (i) viewing the developed holographic medium of step (h) for differences between the exposures of steps (f) and (g) under the criterion that optical interference lines arising from said differences are indicative of the dynamic rotational stress characteristics of said first and second gears.

2. The method of claim 1 wherein the directing means of step (e) comprises a semi-reflecting mirror positioned angularly with respect to both of said rotational axis to direct said reference and object light beams towards the holographic medium.

3. The method of claim 1 wherein the first rotational condition of step (h) is the stationary rotational condition.

* * * * *